United States Patent [19]
Ando

[11] 3,718,804
[45] Feb. 27, 1973

[54] FIXING HEAT-GENERATING PIPE UTILIZING SKIN EFFECT CURRENT

[75] Inventor: Masao Ando, Yokohamashi, Japan

[73] Assignee: Chisso Corporation, Osaka, Japan

[22] Filed: July 2, 1971

[21] Appl. No.: 159,398

[30] Foreign Application Priority Data

July 16, 1970 Japan .................................. 45/62239

[52] U.S. Cl. ..................... 219/301, 137/341, 138/33, 174/47, 219/10.51, 219/300, 219/535
[51] Int. Cl. ............................................. H05b 3/00
[58] Field of Search ......... 219/300, 301, 535, 10.49, 10.51; 138/33; 137/341; 174/45

[56] References Cited

UNITED STATES PATENTS

| | | | |
|---|---|---|---|
| 3,293,409 | 12/1966 | Snelling | 219/341 X |
| 3,293,407 | 12/1966 | Ando | 219/301 |
| 3,214,571 | 10/1965 | Indoe | 219/301 X |
| 3,423,570 | 1/1969 | Trabilcy | 219/301 |
| 1,946,547 | 2/1934 | Russell et al. | 219/301 UX |
| 3,524,966 | 8/1970 | Ando | 219/300 |
| 3,598,959 | 8/1971 | Ando | 219/300 |

*Primary Examiner*—A. Bartis
*Attorney*—Fred C. Philpitt

[57] ABSTRACT

A heat-generating pipe arrangement utilizing skin effect current includes a ferromagnetic pipe and an insulated conductor line passing through the interior of the pipe and having such a circuit therewith that current is concentrated and passed only through the inner surface of the pipe when an alternating current is passed through the circuit. The heat-generating pipe is spaced apart from the outside wall of a pipeline to be heated by interposed spacing means whereby a small clearance of about a millimeter is created and maintained over the entire length of the ferromagnetic pipe to protect the pipeline from being damaged by a possible arc in the event of a failure of the insulation on the conductor inside the ferromagnetic pipe.

6 Claims, 7 Drawing Figures

FIXING HEAT-GENERATING PIPE UTILIZING SKIN EFFECT CURRENT

This invention relates to an improvement in fixing a heat-generating pipe utilizing skin effect current to a material to be heated.

The term "heat-generating pipe utilizing skin effect current" herein used means an apparatus which comprises a ferromagnetic pipe and an insulated conductor line inserted in the pipe and passed therethrough, and has such a structure that, when an alternating current is passed through the insulated conductor line, the alternating current correspondingly passing through the ferromagnetic pipe is concentrated to and passed through an inner skin portion of the ferromagnetic pipe and generates heat, but no current is passed substantially along the outer surface, and includes those disclosed in U.S. Pat. Nos. 3,293,407 and 3,515,837.

The invention is directed to the creation of about a 1 mm clearance between said heat-generating pipe and the outside wall of a pipeline to be heated, to protect the pipeline from being damaged by a possible arc which might take place if the insulated conductor should break down inside the heat-generating pipe. For this object, this invention provides a spacing means interposed between the heat-generating pipe and the outside wall of the pipeline to secure a small clearance space therebetween over the entire length of the pipe, and in this case, the thermal conduction therebetween can be secured with a heat-transfer cement.

The present invention will be now explained, referring to the accompanying drawings.

Figure 1:
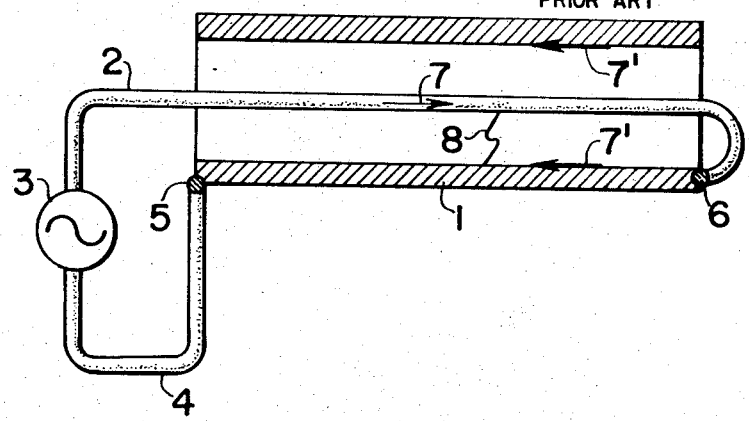
FIGS. 1, 2 and 3 show known circuit principles of various heat-generating pipes utilizing skin effect currents.

In FIG. 1, a circuit principle of a heat-generating pipe utilizing skin effect current disclosed in said U.S. Pat. No. 3,293,407 is shown, wherein numeral 1 is a ferromagnetic pipe, e.g., a steel pipe, and numeral 2 is an insulated conductor line inserted in and passed through the ferromagnetic pipe; one end of the insulated conductor line being connected to a terminal of an alternating current source 3 and the other end thereof being connected to one end of the ferromagnetic pipe, which is located far from the current source. One end 5 of the ferromagnetic pipe 1, which is located near the current source, is connected to the remaining terminal of the alternating current source 3 by means of an electric conductor line 4, and alternating currents 7 and 7' are passed through the insulated conductor line and the ferromagnetic pipe, respectively.

When the resistivity of the ferromagnetic pipe is represented by $\rho$ ($\Omega$ cm), the specific permeability $\mu$ and the frequency of current $f$ (Hz) in the circuit of FIG. 1, the so-called depth of skin, $s$ (cm), is represented by the following formula:

$$s = 5030\sqrt{\frac{\rho}{\mu f}} \quad (1)$$

When the wall thickness of said ferromagnetic pipe is represented by $t$ (cm), the length $l$ (cm) and the inside radius $d$ (cm) in connection to said $s$, and there exist the following relations among these factors:

$$t > 2s, l \gg d \quad (2)$$

the current 7' passing through the ferromagnetic pipe 1 is concentrated to and passed only through the inner surface skin of the ferromagnetic pipe 1, and no voltage appears on the outer surface of the ferromagnetic pipe almost at all. Therefore, even if the outer surface of the ferromagnetic pipe is brought in a short circuit by a conductor of low impedance, no current is passed therethrough almost at all. Even if the outer surface of the ferromagnetic pipe is brought in contact with an electroconductive material to be heated, no current is leaked through the material substantially. The outer surface of the ferromagnetic pipe thus remains safe and the ferromagentic pipe can be utilized as a heat-generating pipe.

Figure 2:
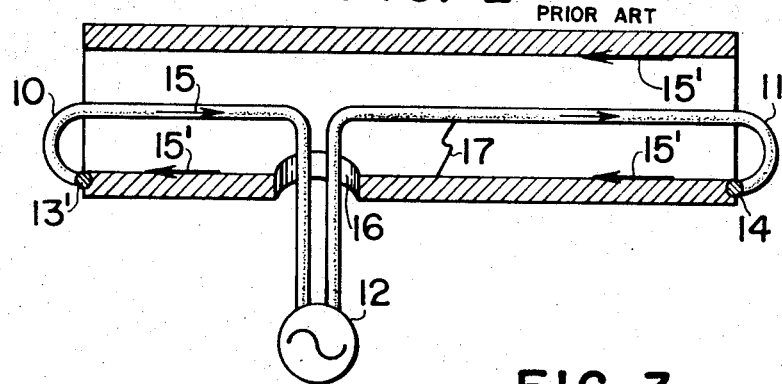

In FIG. 2, the circuit principle is quite similar to that of FIG. 1, but only difference from that of FIG. 1 is that the current feed point is provided at an intermediate point on the ferromagnetic pipe 9. That is to say, in FIG. 2, the insulated conductor lines 10 and 11 are connected to two terminals of a current source 12 and two ends 13 and 14 of the ferromagnetic pipe 9. Numeral 16 is an opening for passing these conductor lines. Through the circuit, currents 15 and 15' are passed. When the ferromagnetic pipe 9 satisfies the conditions represented by the formulas (1) and (2), the current 15' is concentrated to and passed only through the inner surface skin of the ferromagnetic pipe, and thus the ferromagnetic pipe can be utilized as a heat-generating pipe in the same manner as the heat-generating pipe of FIG. 1.

Figure 3:
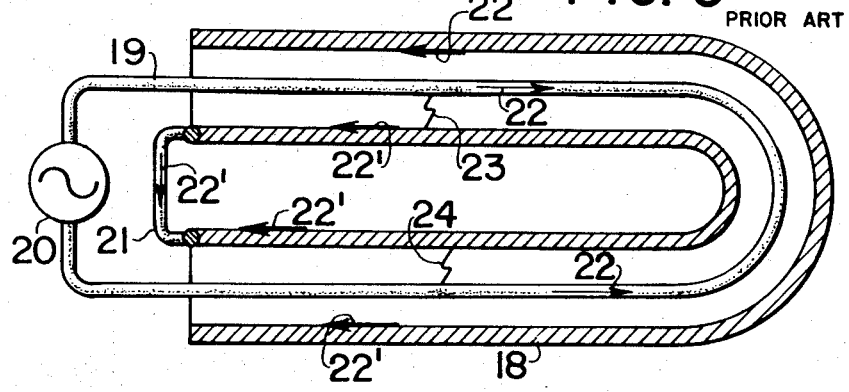

FIG. 3 shows a circuit principle of a heat-generating pipe utilizing skin effect current disclosed in said U.S. Pat. No. 3,515,837.

In FIG. 3, numeral 18 is a ferromagnetic pipe similar to those of FIG. 1 and FIG. 2 as 1 and 9, respectively. The ferromagnetic pipe is in a U-bend form, and these two ends of the pipe are connected to each other by means of a conductor 21 of impedance as low as possible. An insulated conductor line 19 is passed through the ferromagnetic pipe 18 of such structure. When these two ends of the conductor line are connected to two terminals of an alternating current source 20, the primary current 22 is passed through the insulated conductor line 19 as the primary circuit, and the secondary current 22' is passed through the ferromagnetic pipe 18 as the secondary circuit. When the ferromagnetic pipe satisfies the conditions represented by the formulas (1) and (2), the primary current 22 and the secondary current 22' take an equal value, and the current 22' is concentrated only to the inner surface skin of the ferromagnetic pipe 18. No voltage develops on the outer surface of the ferromagnetic pipe almost at all, and the ferromagnetic pipe of FIG. 3 can be also utilized as a heat-generating pipe similarly to those of FIGS. 1 and 2.

These heat-generating pipes can be utilized as a heating source for those which require a temperature maintenance, for example, a pipe line for heavy fuel oil.

Figure 4:
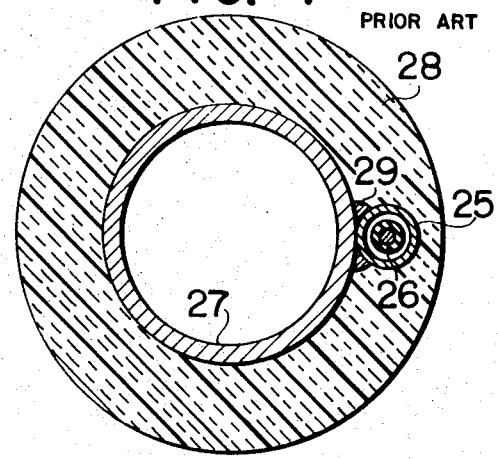
FIGS. 4 and 5 are cross-sectional views of various heat-generating pipes utilizing skin effect current when fixed in the conventional manner.

FIG. 4 shows a cross-sectional view showing an example of fixing a heat-generating pipe utilizing skin effect current to the material to be heated according to the conventional method, where numeral 27 is a transporting pipe, an essential part of the pipe line, 25 the ferromagnetic pipe of said heat-generating pipe utilizing skin effect current, through which an insulated conductor line 26 is passed. The circuit has been already explained, but in the case of the circuit of FIG. 3, it is needless to say that another heat-generating pipe is necessary. Numeral 28 is a thermal insulator layer shown in cross-section for preventing heat radiation from the pipe line, but the thermal insulator layer has nothing to do with the present invention, and thus is omitted from the drawings of FIGS. 5, 6 and 7. In the case of FIG. 4, the ferromagnetic pipe 25 is in contact with the transporting pipe 27 to improve the heat conductance. That is, a welding 29 is usually executed thereto or sometimes heat-conductive cement is applied thereto.

Figure 5:
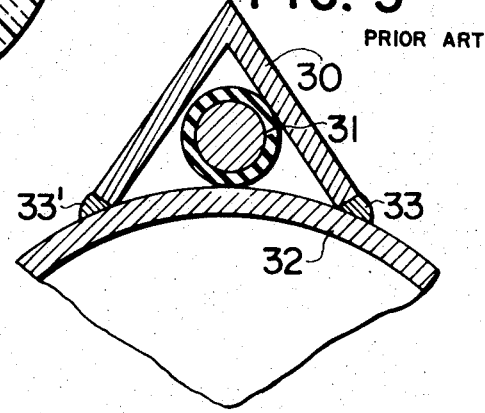

FIG. 5 shows a portion of a cross-section of a pipeline fixed with a heat-generating pipe utilizing skin effect current according to the conventional method similarly to that of FIG. 4, where a part of the ferromagnetic pipe is replaced by a part of the transporting steel pipe 32. That is to say, the ferromagnetic pipe consists of an angle steel 30 of ferromagnetic material and a transporting steel pipe 32 welded with the angle steel. An insulated conductor line 31 is passed through the space within the angle steel and the surface of the transporting steel pipe. Numerals 33 and 33' show the welded parts. When the wall thicknesses of the angle steel 30, transporting steel pipe 32 and welded parts 33 and 33', which constitute the current circuit, are larger than the depth of skin, $s$, as represented by the formula (1) in that case, the current is concentrated only to the inner skin portion of the ferromagnetic pipe and never leaked into other parts of the transporting pipe 32. Thus, the desired object as the heat-generating pipe can be attained.

In FIG. 5, the cross-section of the ferromagnetic pipe is in a triangular form, but can be shaped in any desired form.

The prior art is described with reference to FIGS. 1 – 5, and as long-distance pipelines to be heated emerge, the fixing of the heat-generating pipe has been discussed.

When the heat-generating apparatus utilizing skin effect current is more than 1 kilometer long in the foregoing cases, the voltage of the alternating current source of commercial frequency will exceed 500 V and also the current will be about 50 – 250 A. In that case there is a fear of an occurence of dielectric breakdown at a part of the insulated conductor line within the ferromagnetic pipe as shown by 8 of FIG. 1, 17 of FIG. 2 and 23 and 24 of FIG. 3, owing to failure in design, facility, etc. When a dielectric breakdown takes place, a larger current is concentrated on these breakdown points, and an arc may be generated. Sometimes, the ferromagnetic pipe 25 is melted due to the arc in the case of FIG. 4, and further the transporting pipe 27 is bored. Thus, a portion of the transporting liquid may be leaked through the bore. In the case of FIG. 5, the transporting pipe 32 is more readily bored than in the case of FIG. 4, and there is a high possibility that a portion of the transporting liquid may be leaked through the bore. When the transporting liquid is a combustible material such as a heavy fuel oil, there is a danger of inflammation.

An object of the present invention is to provide a method and apparatus for preventing from a damage, a material to be heated, for example, a transporting pipe, etc., even if an arc is generated, as mentioned above.

According to the present invention, a heat-generating pipe utilizing skin effect current is spaced apart from the outside wall of a material to be heated, and a distance piece or pieces are interposed therebetween and mounted on the material alongside the outside wall of the pipe, to provide a small clearance where the heat-generating pipe and the material to be heated are spaced apart from each other over the entire length of the pipe. However, from the viewpoint of the heat transmission, the clearance may be on the order of millimeter i.e., as minimum a clearance space as practically attainable between the heat-generating pipe and the material to be heated, in mounting the heat-generating pipe on the material to be heated, by means of the distance piece.

The present invention will be explained, referring to FIG. 6. Through a ferromagnetic pipe 34 is passed an insulated conductor line 35, and its circuit is based on the same principle as shown in FIGS. 1 to 3. These members constitute a heat-generating pipe utilizing skin effect current.

Distance pieces 37 and 37' are placed between a ferromagnetic pipe 34 and a transporting pipe 36 so that the heat-generating pipe utilizing skin effect current may not be in close contact with the transporting pipe 36 and a small clearance, for example, a clearance of about 1 mm, may be provided therebetween. It is possible to weld the distance pieces 37 and 37' to the ferromagnetic pipe 34 and the transporting pipe 36 by weldings 38, as shown at the left side half of FIG. 6, to improve a heat conductance between the ferromagnetic pipe as the heat-generating pipe and the transporting pipe. In that case, a cheap material such as steel can be used as the distance piece 37, and workability is better when steel is used. Further, as shown in the right side half of FIG. 6, it is not always necessary to use a material having a good heat conductance such as steel, as the distance piece 37', when heat-transfer cement 38' is used. However, it is necessary to tighten the ferromagnetic pipe 34 and the transporting pipe 36 by a band in the conventional manner to fix the ferromagnetic pipe to the transporting pipe.

Figure 6:
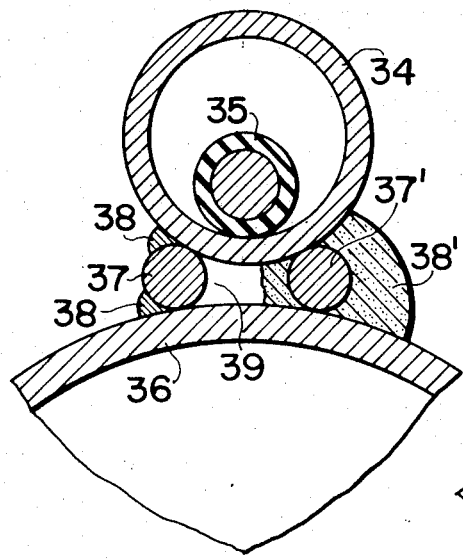
FIGS. 6 and 7 are cross-sectional views showing modes of fixing the heat-generating pipe utilizing skin effect current according to the present invention.

In FIG. 6, the left side half and the right side half are shown in different embodiments to illustrate said two examples, but in the actual practice, any of these examples is executed, and these two embodiments are not carried out at the same point simultaneously.

Figure 7:
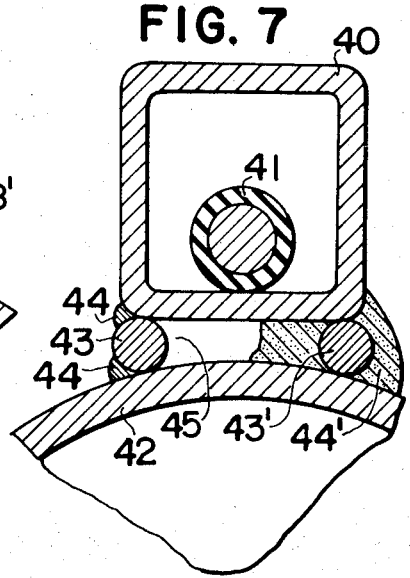

In FIG. 7, a ferromagnetic pipe 40 having a square cross-section is shown in place of the ferromagnetic pipe 34 of circular cross-section of FIG. 6, but the pipe having a square cross-section is more expensive than the pipe having a circular cross-section, and is not usually used.

In FIG. 7, numeral 41 is an insulated conductor line, 42 a transporting pipe, 43 and 43' distance pieces, 44 a welding and 44' heat-transfer cement. A small clearance 45 is provided by these members, as in the case of FIG. 6.

As explained referring to FIGS. 6 and 7, in the present invention, when an arc is generated between the conductor line and the ferromagnetic pipe due to the dielectric breakdown of the insulated conductor line passed through the ferromagnetic pipe, further occurence of boring on the transporting pipe, can be prevented by providing a small clearance, usually a clearance of about 1 mm, between the heat-generating pipe of a ferromagnetic pipe and the transporting pipe as a material to be heated. The heat transfer from the heat-generating pipe to the transporting pipe is carried out through the distance pieces or the heat-transfer cement, and therefore a temperature difference between the heat-generating pipe and the transporting pipe is slightly higher when fixed according to the present invention, than that of the well-known one. However, even when only a distance piece is applied, the temperature difference is only by about 2° – 3° C higher so long as a material having a relatively high thermal conductivity such as steel is used for the distance piece. Moreover, when heat-transfer cement fully covers the surroundings of the distance piece, the temperature difference is such an extent as approximately an error of measurement.

In the most cases, the heat-transfer cement comprises a carbonaceous material and has a high arc resistance. It has been experimentally confirmed that the transporting pipe is not damaged by the arc when the cement is filled between the heat-generating pipe and the material to be heated.

When the ferromagnetic pipe is to be fixed directly on the transporting pipe as shown in FIG. 4, it is practically impossible to make a small clearance between the ferromagnetic pipe and the transporting pipe in process of welding. On the other hand, when there is a distance piece as shown in FIG. 6, a definite clearance can be ensured.

In the foregoing explanation, only cases where the material to be heated is a transporting pipe, that is, pipe line to be maintained at an elevated temperature are illustrated, but the present invention can be utilized equally, when a material to be treated is liable to be damaged by an arc between the ferromagnetic pipe and the insulated conductor line of the heat-generating pipe utilizing skin effect current.

I claim:

1. A heating structure which comprises
   a. a heat-generating pipe utilizing skin effect current and consisting of a ferromagnetic pipe and an insulated conductor line,
      1. said insulated conductor line
         A. passing through the interior of the ferromagnetic pipe, and
         B. having such a circuit that a current is concentrated to and passed only through the inner portion of the ferromagnetic pipe when an alternating current is passed through the conductor line,
   b. a pipeline to be heated by said heat-generating line,
   c. said heat-generating pipe and said pipeline being longitudinally aligned with respect to each other, with the heat-generating pipe located adjacent the outside wall of said pipeline,
   d. spacing means being welded between said heat generating pipe and said pipeline,
   e. the size and placement of said spacing means being such that a small clearance in the order of about a millimeter is maintained between said heat-generating pipe and said pipeline over the entire length of the heat-generating pipe.

2. A heating structure according to claim 1 wherein the spacing means is fully covered with a heat-transfer cement so as to thereby improve the heat transfer between the heat-generating pipe and the pipeline.

3. A heating structure according to claim 1 wherein heat-transfer carbonaceous cement fully occupies the entire clearance space between the heat-generating pipe and the pipeline.

4. A heating structure which comprises
   a. a heat-generating pipe utilizing skin effect current and consisting of a ferromagnetic pipe and an insulated conductor line,
      1. said insulated conductor line
         A. passing through the interior of the ferromagnetic pipe, and
         B. having such a circuit that a current is concentrated to and passed only through the inner portion of the ferromagnetic pipe when an alternating current is passed through the conductor line,
   b. a pipeline to be heated by said heat-generating pipe,
   c. said heat-generating pipe and said pipeline being longitudinally aligned with respect to each other, with the heat-generating pipe located adjacent the outside wall of said pipeline,
   d. spacing means interposed between said heat-generating pipe and said pipeline,
   e. the size and placement of said spacing means being such that a distance in the order of a millimeter is maintained between said heat-generating pipe and said pipeline over the entire length of the heat-generating pipe.

5. A heating structure according to claim 4 wherein heat-transfer cement comprising a carbonaceous material fully covers the spacing means so as to thereby improve heat transfer between the heat-generating pipe and the pipeline.

6. A heating structure according to claim 4 wherein heat-transfer cement comprising a carbonaceous material fully occupies the entire clearance space between the heat-generating pipe and the pipeline.

* * * * *